United States Patent [19]

Sosnosky

[11] Patent Number: 5,218,604
[45] Date of Patent: Jun. 8, 1993

[54] DUAL-HUBBED ARRANGEMENT TO PROVIDE A PROTECTED RING INTERCONNECTION

[75] Inventor: Joseph Sosnosky, Wall, N.J.

[73] Assignee: Bell Communications Research, Inc., Livingston, N.J.

[21] Appl. No.: 577,273

[22] Filed: Aug. 31, 1990

[51] Int. Cl.$^5$ .............................................. H04J 3/02
[52] U.S. Cl. .............................. 370/85.14; 370/85.12; 370/16.1; 340/825.05
[58] Field of Search ............... 370/85.12, 85.13, 85.14, 370/85.15, 85.16, 16, 94.1, 16.1, 85.4, 95.1, 13; 340/825.05; 371/8.1, 11.1

[56] References Cited

U.S. PATENT DOCUMENTS

| | | | |
|---|---|---|---|
| 3,652,798 | 3/1972 | McNeilly et al. | 370/16.1 |
| 4,696,001 | 9/1987 | Gagliardi et al. | 370/16 |
| 4,797,882 | 1/1989 | Maxemchuk | 370/94.1 |
| 4,835,763 | 5/1989 | Lau | 370/16.1 |
| 4,847,837 | 7/1989 | Morales et al. | 370/16 |
| 4,964,120 | 10/1990 | Mostashari | 370/16 |
| 5,016,244 | 5/1991 | Massey, Jr. et al. | 370/85.13 |

*Primary Examiner*—Douglas W. Olms
*Assistant Examiner*—Dang Ton
*Attorney, Agent, or Firm*—Leonard Charles Suchyta; John T. Peoples

[57] ABSTRACT

An arrangement of coupled hybrid rings is disclosed which can withstand a failed node or a cut ring in either or both of the hybrid rings, as well as an outage of one of the two serving nodes utilized to interconnect the hybrid rings. The pair of serving nodes are interposed in each of the hybrid rings and serve to transmit signals between the two rings to satisfy the hybrid ring requirement of having equivalent signals propagating in two opposing directions on the unidirectional rings composing an individual hybrid ring.

8 Claims, 4 Drawing Sheets

DUAL-HUBBED ARRANGEMENT TO PROVIDE A PROTECTED RING INTERCONNECTION

CROSS-REFERENCE TO A RELATED APPLICATION

The following U.S. application, which is assigned to the same assignee as the instant application and is filed concurrently therewith, contains related subject matter: "Self-Healing Meshed Network Using Logical Ring Structures" Ser. No. 07/577,219 of N. Sandesara.

FIELD OF THE INVENTION

The invention relates generally to a communications network and, more specifically, to the interconnection of self-healing ring networks.

BACKGROUND OF THE INVENTION

A ring communications network is made up of nodes that are connected in tandem by a unidirectional communications path. Each node receives transmissions from the adjacent upstream node, and if the communication is destined for a downstream node, the communication is re-transmitted to the adjacent downstream node. Otherwise, each node transmits its own communications to the adjacent downstream node.

A drawback of such a network is that a break in the ring would prevent any node upstream of the break from communicating with any node downstream of the break. Similarly, the complete failure of a node would have the same effect as a break in the ring.

Many designs have been proposed to minimize these difficulties. The most common approach is to provide a second communications ring parallel to the first. In that case, a fault in one ring could be bypassed by transferring communications to the second ring. Alternatively, if the second ring transmitted in the opposite direction as the first, a break in both rings between two adjacent nodes could be remedied by the nodes on either side of the break looping back communications received on one ring onto the other ring. Such a system is described in McNeilly et al, U.S. Pat. No. 3,652,798.

The main problem with such approaches is that the equipment required to detect and locate a fault, and then appropriately reconnect transmitters and receivers with the alternate ring, is complicated and costly.

An approach that alleviates some of these difficulties is described in Lau, U.S. Pat. No. 4,835,763, which is assigned to the same assignee as is the present invention. In Lau, a subrate multiplexed signal is utilized for ring communications. Each node has the capability of demultiplexing the main signal into its constituent subrates (channels), and channels destined for that node (local channels) are sent to receiving equipment within the node, while channels destined for downstream nodes (through channels) are multiplexed with originating local channels, and the resultant high level signal is transmitted to the adjacent downstream node. This process is simultaneously performed using identical equipment in the node for a second ring transmitting in the opposite direction. If a node detects a fault in an incoming line, an error signal is placed on all of the channels following the demultiplexing. The receiving equipment in each node includes a selector which monitors the communications arriving on each local channel from both rings. If an error signal is detected on a local channel, the selector selects the communication from the associated channel of the other ring to send to the receiver.

In this way, a break in both rings between two adjacent nodes will not cause a failure in the system, and no complicated fault locating and switching equipment is required to continue service. Similarly, the complete failure of a node will not destroy communications among the remaining nodes.

It should be noted that unlike prior survivable ring arrangements which maintain their ring characteristics following a fault, the arrangement of Lau ceases functioning as a ring if the ring is broken. However, communications among the nodes is maintained following such a break. For this reason, the arrangement of Lau has been called a hybrid ring, since it normally operates as a ring, but then it does not operate as a ring following a break in the ring or the loss of a node.

In Lau, an arrangement for interconnecting two autonomous but interrelated rings is disclosed. In this arrangement, simultaneous breaks in both rings can be compensated without loss of communications between any two nodes. The arrangement employs a master node from each ring and two unidirectional paths connected between the master nodes to couple the two rings. Even though the rings are protected from breaks in each ring, an outage in either master node or a unidirectional path breaks the communication path from one interrelated ring to the other.

SUMMARY OF THE INVENTION

These shortcomings as well as other limitations and deficiencies are obviated in accordance with the present invention by an arrangement of a pair of serving nodes, coupled to both hybrids, which communicate commensurate signals in parallel between the two hybrid rings.

In accordance with the broad aspect of the present invention, a pair of serving nodes are interposed in each of two independent hybrid rings. To propagate signals from the first hybrid ring to the second hybrid ring, the first serving node couples both unidirectional paths of the first hybrid to the first unidirectional path of the second hybrid, whereas the second serving node couples both unidirectional paths of the first hybrid to the second unidirectional path of the second hybrid. To propagate signals from the second ring to the first ring, the first serving node couples both unidirectional paths of the second hybrid to the second unidirectional path of the first hybrid, whereas the second serving node couples both unidirectional paths of the second hybrid to the first unidirectional path of the first hybrid.

A property of the present invention is that the pair of serving nodes provide a protected interconnection between multiple survivable ring networks. Any traffic (i.e., channels) that passes between rings is fully and automatically protected against the loss of a serving node, where a serving node provides paths between rings. For survivability of traffic, protection against the loss of a serving node is essential in addition to having protection against a break in the ring.

The organization and operation of this invention will be understood from a consideration of the detailed description of the illustrative embodiment, which follows, when taken in conjunction with the accompanying drawing.

DETAILED DESCRIPTION

Prior Art

Figure 1:
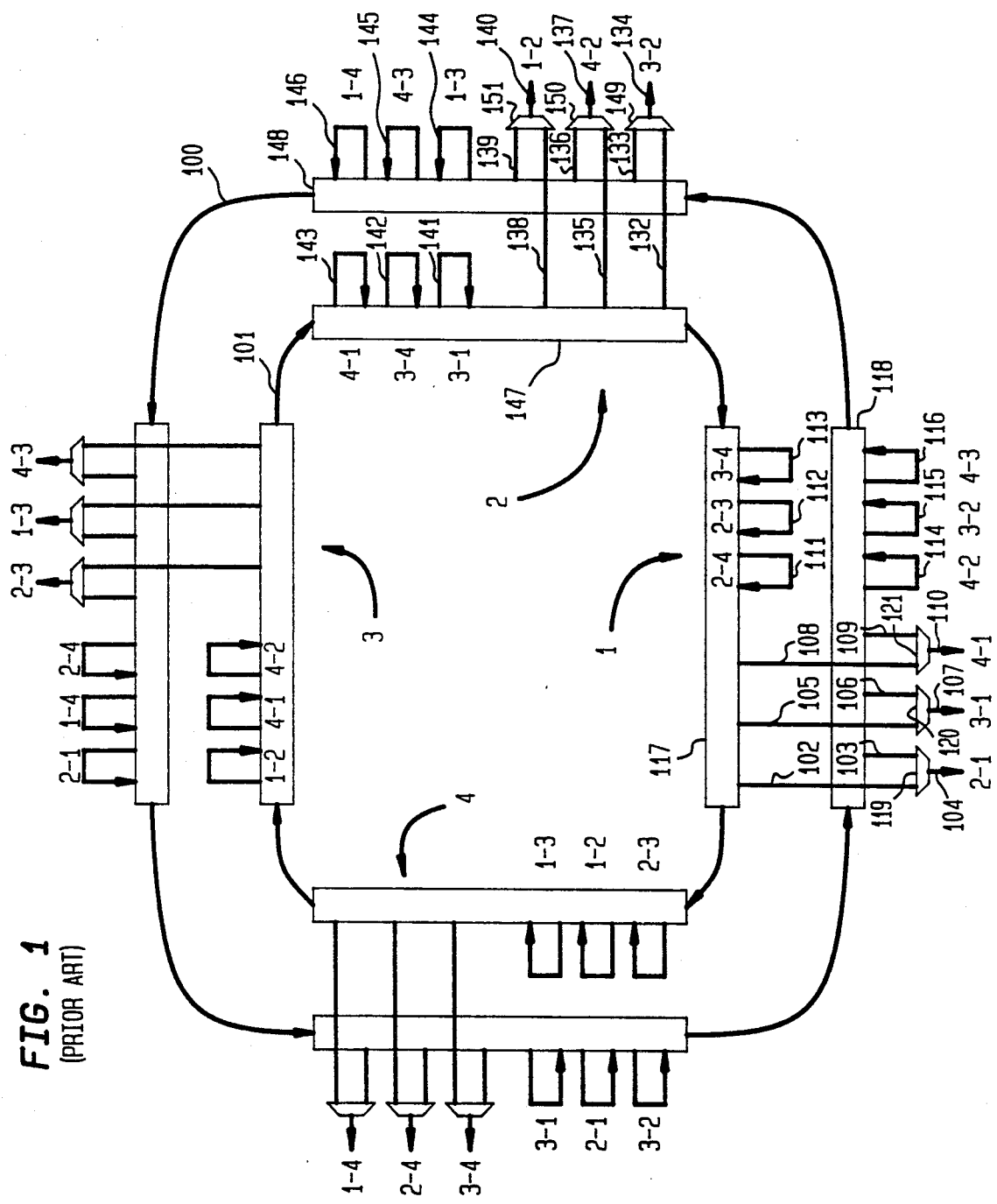
FIG. 1 is a prior art circuit diagram for the basic hybrid ring.

By way of introducing terminology and notation useful in elucidating the present invention, the basic hybrid ring network as disclosed by Lau (U.S. Pat. No. 4,835,763) is first discussed in overview fashion. The basic hybrid ring is depicted in FIG. 1, which is FIG. 1 of the Lau patent and reference should be made to the Lau patent for elements of FIG. 1 not further discussed herein. With reference to FIG. 1, node 1 comprises controllers 117 and 118 and selectors 119-121. Controller 117 is connected with ring 101, which carries signals in a clockwise direction, and controller 118 is connected with ring 100, which carries signals in a counterclockwise direction. Illustratively, the signals on each ring comprise six subrate channels, each of which is dedicated to communications between a pre-selected pair of basically identical nodes. Each node feeds three subrate receivers (not shown), which in the case of node 1 have lines 104, 107 and 110, respectively, as input.

The channel carrying communications between nodes 2 and 1 would be extracted from ring 101 by controller 117 (by demultiplexing the signal on ring 101), and sent to selector 119 over line 102. Controller 118 would extract the associated channel off ring 100 and send it to selector 119 over line 103. Selector 119 would select one of the signals arriving on lines 102 and 103, based on the presence or absence of an error signal on either line. The selected signal would be sent to the receiver over line 104. A transmitter (not shown) would transmit two identical signals destined for node 2, one to controller 117 and one to controller 118, for reinsertion into the respective loops.

Channels associated with communications between nodes 3 and 1, and between nodes 4 and 1, would operate in a similar manner utilizing selectors 120 and 121, respectively. Controllers 117 and 118 then multiplex the three channels originating from node 1 with the three through channels, and transmit the resultant higher level signals on their associated loops (loop 101 toward node 4 and loop 100 toward node 2). In this way, each node has two redundant communications paths to each of the other nodes, both paths being continuously active.

When a break occurs in the rings, say rings 100 and 101 are broken between node 1 and node 4, the arrangement of controllers and selectors in each node react so as to preserve communications paths among all of the nodes.

Figure 2:
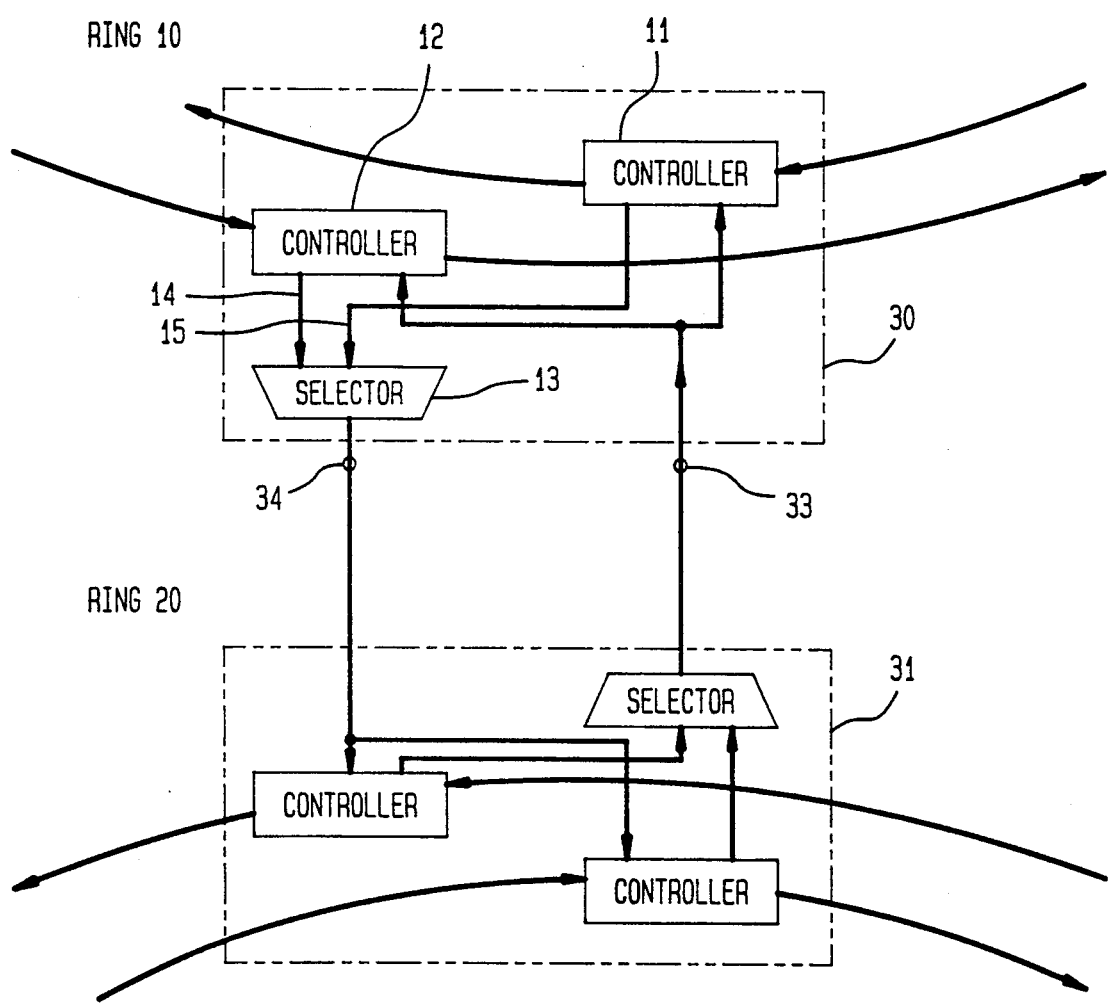
FIG. 2 is a diagram of a portion of a prior art master-/master arrangement for the non-protected interconnection of two hybrid ring networks.

The arrangement shown in FIG. 2 depicts the manner of interconnecting two interrelated nodes in the master-master relationship as disclosed by Lau; the two master rings are denoted by reference numerals 10 and 20, respectively. Each ring has an interposed master node shown as nodes 30 and 31, respectively. In turn, each node includes an arrangement of two controllers 11 and 12 and a selector 13; these components are basically the same as controllers 117 and 118 and selector bank 119-121 in node 1 of Lau. Nodes 30 and 31 are interconnected by unidirectional communication paths 33 and 34. Although breaks in a ring are protected because each ring is a hybrid type, master node outages and/or a break in paths linking the master nodes are unprotected.

Finally, by way of additional terminology, the arrangement in FIG. 2 of node 30 is referred to below as an ADM (Add-Drop Multiplexer) node, whereas the arrangement of controllers 11 and 12, selector 13, input links 14 and 15, and output link 34 is referred to as a DM (Drop Multiplexer) node.

Present Invention

Figure 3:
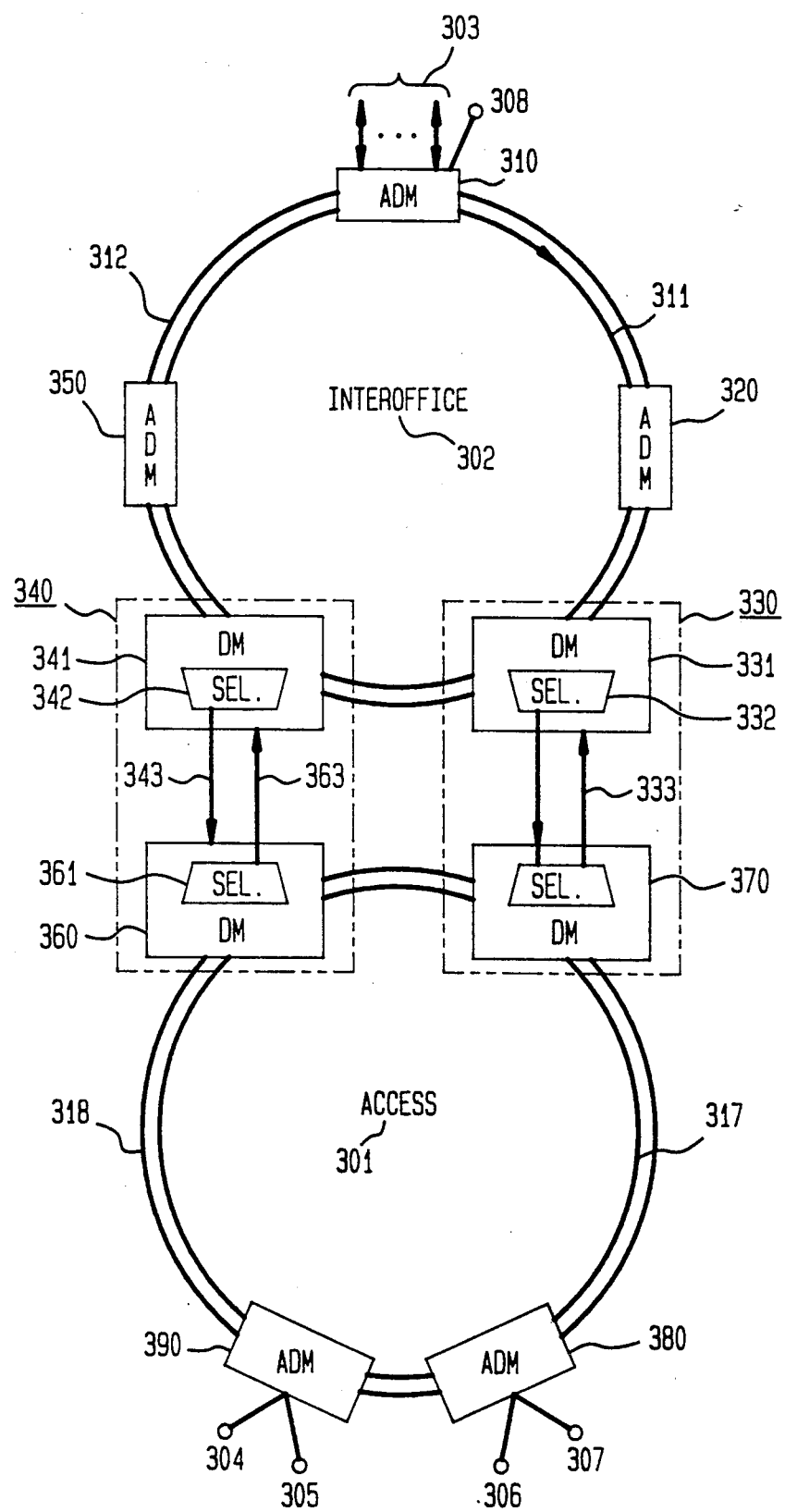
FIG. 3 is a block diagram of an arrangement in accordance with the present invention for interconnecting first and second hybrid rings in a protected manner.

A configuration illustrative of the present invention is shown in FIG. 3, which depicts the manner in which two hybrid rings can be interconnected in a dual-hubbed arrangement to provide protection against node failures. With reference to FIG. 3, starting at ADM node 310 in ring 302, channels 303 destined for access ring 301 are added onto interoffice ring 302 by multiplexing them with "through" channels on ring 302, thus creating a channelized high level signal on ring 302. Ring 301 comprises two unidirectional communication paths 317 and 318 transmitting in opposing directions, and similarly ring 302 comprises two unidirectional paths 311 and 312. Also, for purposes of the present discussion, it is assumed that ring 302 operates at a higher level than ring 301 in a given hierarchical network. ADM 310 transmits these newly added channels in both the clockwise (CW) and counterclockwise (CCW) directions on ring 302 on paths 311 and 312, respectively. These newly added channels from node 310 travel through adjacent nodes 320 and 350 to the designated serving nodes, i.e., primary node 340 and secondary node 330, which distribute channels on ring 302 to various customer terminations 304-307 on ring 301. Channel assignments onto ring 301 are made at serving nodes 330 and 340.

Channels from node 310 are routed to both primary and secondary serving nodes 340 and 330 via a so-called "drop-and-continue" property. The drop-and-continue property permits the same traffic to be delivered to the two serving nodes from the same direction. For instance, CCW traffic on path 312 is dropped off at DM 341 and passed to DM 331. Likewise, CW traffic on path 311 is dropped off at DM 331 and passed to DM 341. Thus, with the drop-and-continue property, the continued signal is forwarded like a pass-through signal; in this way both primary 340 and secondary node 330 can select from equivalent signals. During normal operating conditions (i.e., no ring failures) 2:1 selectors 342 and 332 in the primary and secondary serving nodes 340 and 330, respectively, are set up such that the preferred (or default) signal for traffic selection are opposite of each other, assuring that a break in ring 302 will not cause channel switching in both the serving nodes. Hence, at primary serving node 340, selector 342 in DM 341 selects either the CW or CCW channel received from node 310, and this signal serves as the input to DM 360 via link 343. DM 360 transmits this signal in only the CCW direction, namely, path 318 on ring 301. This implies that a selector is needed only for each channel received from ADM node 310. The same procedure is effected at secondary node 330, except that DM 370 transmits the preselected signal from DM 331 in only the CW direction, namely, path 317 on ring 301. This procedure therefore satisfies the hybrid ring requirement of having equivalent signals in the CW and CCW directions. It is to be noted that other ADM nodes (not shown) may be interposed between the two serving nodes without interfering with the operation of the dual-hubbed arrangement.

In the same manner, traffic from customer terminations 304–307 on ring 301 (heading back to node 310) is routed through ADM's 380 and 390 to both primary and secondary nodes 340 and 330 via the drop-and-continue property. Channel assignments onto ring 302 are made at serving nodes 340 and 330. Selected traffic out of primary and secondary nodes 340 and 330 is transmitted in only one direction on ring 302, opposite to each other, thus satisfying the hybrid ring requirement of having equivalent signals in the CW and CCW directions on interoffice ring 302.

Figure 4:
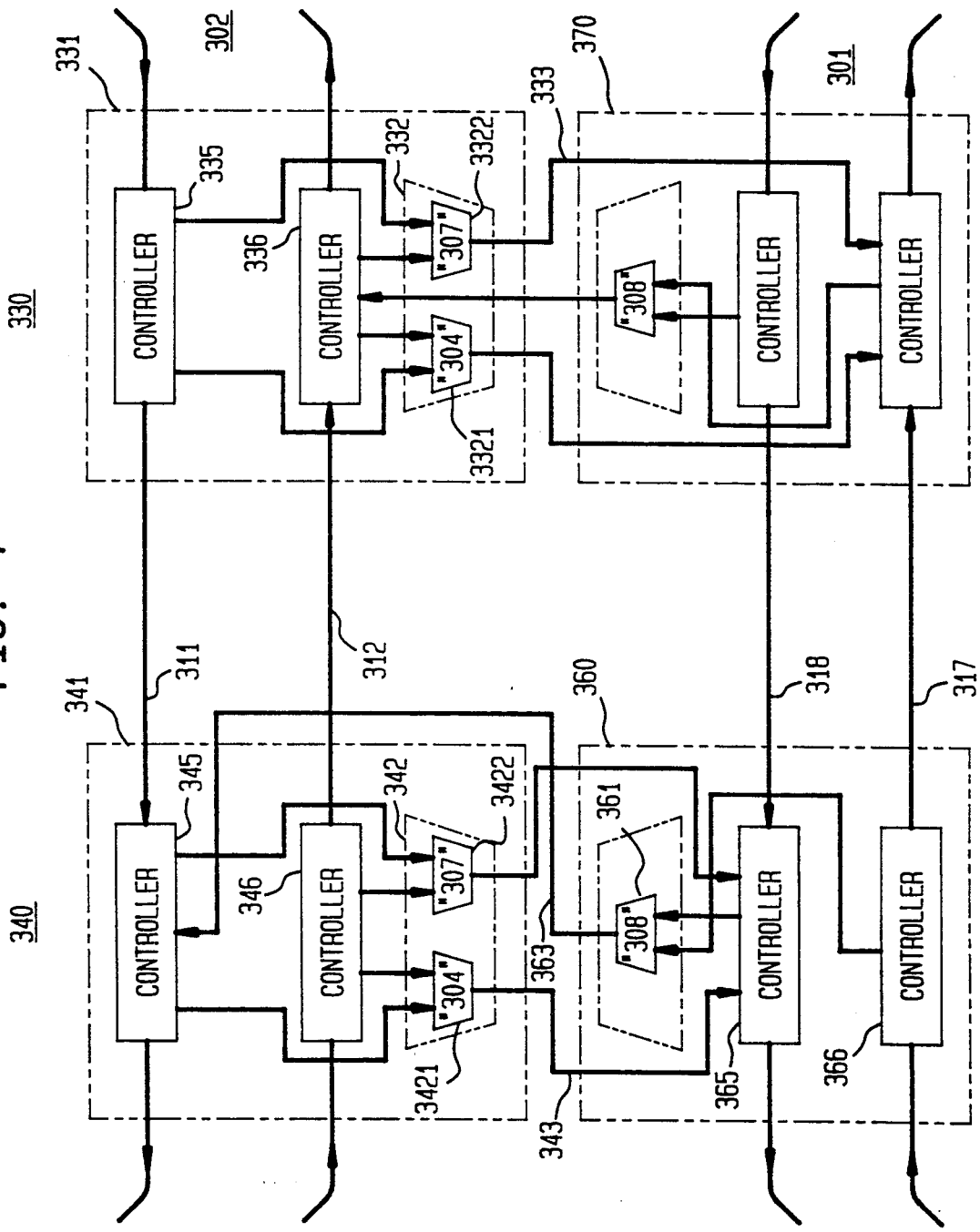
FIG. 4 is a block diagram depicting interoffice ring channels coupled to the access ring as well as an access channel coupled to the interoffice ring.

The block diagram of FIG. 4 is illustrative of the routing of channel signals between interoffice ring 302 and access ring 301. In particular, the routing of channel signals to terminations 304 and 307 from ring 302, and the routing of a channels signal from ring 301 to termination 308 are shown in detail. DM 341 is shown to comprise controllers 345 and 346 as well as selector bank 342, which has been partitioned into two individual selectors 3421 and 3422. Selector 3421 is presently assigned to route signals to termination 304 (designated by "304" in selector 3421), and selector 3422 is assigned routing of signals for termination 307 ("307"). Both controllers 345 and 346 feed channel signals to selector 342 and the appropriate channel is then routed to the assigned individual selectors 3421 or 3422. The output of selector 3421 is propagated over link 343 to DM 360. In the arrangement illustrated by FIG. 4, link 343 connects to controller 365 in DM 360; this controller couples to the CCW path of hybrid ring 301. Similar comments also apply to the routing of the channel signal destined for termination 307.

To illustrate the technique for routing channel signals from ring 301 to ring 302, the routing of the channel signal through controllers 365 and 366 and selector 361 in DM 360 is considered as exemplary. In this case, the channel assigned to selector 361 is termination 308, which is dropped from ADM 310. Controllers 365 and 366 feed duplicate signals from the two unidirectional rings of ring 301 to selector 361. The output of this selector is propagated over link 363 to controller 345 in DM 341.

DM 331 similarly comprises controller 335 and 336 and selector bank 332, including selectors 3321 and 3322.

It is important to emphasize that serving node 330 is arranged in complementary manner to serving node 340, that is, node pair DM 341 and DM 360 serve one of the unidirectional rings in each hybrid; similarly, node pair DM 331 and DM 370 serve the other of the unidirectional rings. Accordingly, the operation of primary and secondary nodes 340 and 330 is symmetrical. With this arrangement, service will continue between ring 301 and ring 302 in the event of loss of primary node 340 or secondary node 330, including interconnecting links represented by links 333, 343, and 363, and there is always a path between interoffice and access rings with the loss of either node. Restoration is automatic in the event of a node failure; no rerouting of traffic to secondary node 330 is necessary. Also, both rings 301 and 302 are treated as autonomous, independent rings which makes for a robust network. For example, when there is a break in either ring, the operation in the other ring is not affected (i.e., there is no need to initiate fault recovery via channel switching). Any fault recovery is confined to the ring with the fault. This means that ring 302 can operate at a different channel selector level than ring 301 and vice versa. More notably, this configuration can survive a simultaneous break in both the ring 301 and ring 302 networks without loss of communications between rings 301 and 302.

It is to be understood that the above-described embodiment is simply illustrative of the principles in accordance with the present invention. Other embodiments may be readily devised by those skilled in the art which may embody the principles in spirit and scope. Thus, it is to be further understood that the circuit arrangement described herein is not limited to the specific forms shown by way of illustration, but may assume other embodiments limited only by the scope of the appended claims.

What is claimed is:

1. Circuitry for interconnecting a first hybrid ring network to a second hybrid ring network wherein each ring includes first and second unidirectional paths, the circuitry comprising a first autonomous serving node, coupled to the hybrid rings, for coupling the unidirectional paths of the first hybrid ring to the first unidirectional path of the second hybrid ring, said first autonomous serving node including a first drop-multiplexer coupled to the unidirectional paths of the first hybrid for selecting subrate channels from either the first or second multiplexed subrate channels and for communicating said selected subrate channels to only the first unidirectional path of the second hybrid ring; and a second drop-multiplexer coupled to the unidirectional paths of the second hybrid for choosing subrate channels from either the first or second multiplexed subrate channels and for communicating said chosen subrate channels to only the second unidirectional path of the first hybrid ring, and a second autonomous serving node, coupled to the hybrid rings, for coupling the unidirectional paths of the first hybrid ring to the second unidirectional path of the second hybrid ring.

2. Circuitry for interconnecting a first hybrid ring network to a second hybrid ring network wherein each ring includes first and second unidirectional paths, the circuitry comprising a first autonomous serving node, coupled to the hybrid rings, for coupling the unidirectional paths of the first hybrid ring to the first unidirectional path of the second hybrid ring, and a second autonomous serving node, coupled to the hybrid rings, for coupling the unidirectional paths of the first hybrid ring to the second unidirectional path of the second hybrid ring, said second autonomous serving node including a first drop-multiplexer coupled to the unidirectional paths of the first hybrid for selecting subrate channels from either the first or second multiplexed subrate channels and for communicating said selected subrate channels to only the the second unidirectional path of the second hybrid ring; and a second drop-multiplexer coupled to the unidirectional paths of the second hybrid for choosing subrate channels from either the first or second multiplexed subrate channels and for communicating said chosen subrate channels to only the first unidirectional path of the first hybrid ring.

3. Circuitry for interconnecting a first hybrid ring network to a second hybrid ring network wherein each ring includes first and second unidirectional paths, with the first and second unidirectional paths propagating first and second multiplexed subrate channels, respectively, the circuitry comprising a first autonomous serving node, coupled to the hybrid rings, for coupling the unidirectional paths of the first hybrid ring to the first unidirectional path of the second hybrid ring and for coupling the unidirectional paths of the second hybrid ring to the second unidirectional path of the first hybrid ring, said first autonomous serving node including a first drop-multiplexer coupled to the unidirectional paths of the first hybrid ring for selecting subrate channels from either the first or second multiplexed subrate channels and for communicating said selected subrate channels to only the first unidirectional path of the second hybrid ring; and a second drop-multiplexer coupled to the unidirectional paths of the second hybrid ring for choosing subrate channels from either the first or second multiplexed subrate channels and for communicating said chosen subrate channels to only the second unidirectional path of the first hybrid ring, and a second autonomous serving node, coupled to the hybrid rings, for coupling the unidirectional paths of the first hybrid ring to the second unidirectional path of the second hybrid ring and for coupling the unidirectional paths of the second hybrid ring to the first unidirectional path of the first hybrid ring, said second autonomous serving node including a third drop-multiplexer coupled to the unidirectional paths of the first hybrid ring for generating subrate channels from either the first or second multiplexed subrate channels and for communicating said generated subrate channels to only the second unidirectional path of the second hybrid ring; and a fourth drop-multiplexer coupled to the unidirectional paths of the second hybrid ring for producing subrate channels from either the first or second multiplexed subrate channels and for communicating said produced subrate channels to only the first unidirectional path of the first hybrid ring.

4. Circuitry for interconnecting a first hybrid ring network to a second hybrid ring network wherein each ring includes clockwise (CW) and counterclockwise (CCW) unidirectional paths, the circuitry comprising a first autonomous serving node, coupled to the hybrid rings, for coupling the unidirectional paths of the first hybrid ring to the CW unidirectional path of the second hybrid ring, said first autonomous serving node including a first drop-multiplexer coupled to the unidirectional paths of the first hybrid for selecting subrate channels from either the first or second multiplexed subrate channels and for communicating said selected subrate channels to only the CW unidirectional path of the second hybrid ring; and a second drop-multiplexer coupled to the unidirectional paths of the second hybrid for choosing subrate channels from either the first or second multiplexed subrate channels and for communicating said chosen subrate channels to only the CCW unidirectional path of the first hybrid ring, and a second autonomous serving node, coupled to the hybrid rings, for coupling the unidirectional paths of the first hybrid ring to the CCW unidirectional path of the second hybrid ring.

5. Circuitry for interconnecting a first hybrid ring network to a second hybrid ring network wherein each ring includes clockwise (CW) and counterclockwise (CCW) unidirectional paths, the circuitry comprising a first autonomous serving node, coupled to the hybrid rings, for coupling the unidirectional paths of the first hybrid ring to the CW unidirectional path of the second hybrid ring, and a second autonomous serving node, coupled to the hybrid rings, for coupling the unidirectional paths of the first hybrid ring to the CCW unidirectional path of the second hybrid ring, said second autonomous serving node including a first drop-multiplexer coupled to the unidirectional paths of the first hybrid for selecting subrate channels from either the first or second multiplexed subrate channels and for communicating said selected subrate channels to only the the CCW unidirectional path of the second hybrid ring; and a second drop-multiplexer coupled to the unidirectional paths of the second hybrid for choosing subrate channels from either the first or second multiplexed subrate channels and for communicating said chosen subrate channels to only the the CW unidirectional path of the first hybrid ring.

6. Circuitry for interconnecting a first hybrid ring network to a second hybrid ring network wherein each ring includes clockwise (CW) and counterclockwise (CCW) unidirectional paths, with the CW and CCW unidirectional paths propagating first and second multiplexed subrate channels, respectively, the circuitry comprising a first autonomous serving node, coupled to the hybrid rings, for coupling the unidirectional paths of the first hybrid ring to the CW unidirectional path of the second hybrid ring and for coupling the unidirectional paths of the second hybrid ring to the CCW unidirectional path of the first hybrid ring, said first autonomous serving node including a first drop-multiplexer coupled to the unidirectional paths of the first hybrid ring for selecting subrate channels from either the first or second multiplexed subrate channels and for communicating said selected subrate channels to only the CW unidirectional path of the second hybrid ring; and a second drop-multiplexer coupled to the unidirectional paths of the second hybrid ring for choosing subrate channels from either the first or second multiplexed subrate channels and for communicating said chosen subrate channels to only the CCW unidirectional path of the first hybrid ring, and a second autonomous serving node, coupled to the hybrid rings, for coupling the unidirectional paths of the first hybrid ring to the CCW unidirectional path of the second hybrid ring and for coupling the unidirectional paths of the second hybrid ring to the CW unidirectional path of the first hybrid ring, said second autonomous serving node including a third drop-multiplexer coupled to the unidirectional paths of the first hybrid ring for generating subrate channels from either the first or second multiplexed subrate channels and for communicating said generated subrate channels to only the CCW unidirectional path of the second hybrid ring; and a fourth drop-multiplexer coupled to the unidirectional paths of the second hybrid for producing subrate channels from either the first or second multiplexed subrate channels and for communicating said produced subrate channels to only the CW unidirectional path of the first hybrid ring.

7. A method for transmitting multiplexed signals between a first hybrid ring network and a second hybrid ring network wherein each ring includes first and second unidirectional paths propagating first and second multiplexed signals, respectively, the method comprising the steps of drop multiplexing a selected one of the first or second multiplexed signals of the first hybrid ring to only the first unidirectional path of the second hybrid ring, drop multiplexing a selected one of the first or second multiplexed signals of the second hybrid ring to only the second unidirectional path of the first hybrid ring, drop multiplexing a selected one of the first or second multiplexed signals of the first hybrid ring to only the second unidirectional path of the second hybrid ring, and drop multiplexing a selected one of the first or second multiplexed signals of the second hybrid ring to only the first unidirectional path of the first hybrid ring.

8. A method for transmitting multiplexed signals between a first hybrid ring network and a second hybrid ring network wherein each ring includes clockwise (CW) and counterclockwise (CCW) unidirectional paths propagating first and second multiplexed signals, respectively, the method comprising the steps of drop multiplexing a selected one of the first or second multiplexed signals of the first hybrid ring to only the CW unidirectional path of the second hybrid ring, drop multiplexing a selected one of the first or second multiplexed signals of the second hybrid ring to only the CCW unidirectional path of the first hybrid ring, drop multiplexing a selected one of the first or second multiplexed signals of the first hybrid ring to only the CCW unidirectional path of the second hybrid ring, and drop multiplexing a selected one of the first or second multiplexed signals of the second hybrid ring to only the CW unidirectional path of the first hybrid ring.

* * * * *